United States Patent
He et al.

(10) Patent No.: US 10,552,441 B2
(45) Date of Patent: Feb. 4, 2020

(54) METHOD AND APPARATUS FOR MULTITHREADING EXTRACTION OF DATA FROM A DATABASE

(71) Applicant: ALIBABA GROUP HOLDING LIMITED, George Town, Grand Cayman (KY)

(72) Inventors: Jianchao He, Hangzhou (CN); Shouyuan Chen, Hangzhou (CN); Xiaoyong Deng, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 767 days.

(21) Appl. No.: 15/154,867

(22) Filed: May 13, 2016

(65) Prior Publication Data
US 2016/0335336 A1    Nov. 17, 2016

(30) Foreign Application Priority Data
May 15, 2015   (CN) .......................... 2015 1 0250681

(51) Int. Cl.
  G06F 17/00   (2019.01)
  G06F 17/30   (2006.01)
  G06F 16/25   (2019.01)
(52) U.S. Cl.
  CPC ................... *G06F 16/258* (2019.01)
(58) Field of Classification Search
  CPC .................. G06F 17/30569; G06F 9/46
  (Continued)

(56) References Cited

U.S. PATENT DOCUMENTS 6,408,308 B1 * 6/2002 Maslyn .................. G16B 50/00
                                                                707/776
8,260,824 B2 * 9/2012 Mao ...................... G06F 16/288
                                                                707/803
(Continued)

FOREIGN PATENT DOCUMENTS

CN        101071420 A        11/2007
CN        102479217 A         5/2012
(Continued)

OTHER PUBLICATIONS

PCT International Search Report and Written Opinion dated Aug. 12, 2016, issued in corresponding International Application No. PCT/US2016/032517 (9 pages).

(Continued)

*Primary Examiner* — Binh V Ho
(74) *Attorney, Agent, or Firm* — Finnegan, Henderson, Farabow, Garrett & Dunner, LLP

(57) ABSTRACT

A method of multithreading extraction of data from a database is provided. The method comprises: acquiring a set of primary key character strings, the primary key character strings being uniquely associated with the data to be extracted from the database; extracting, from the primary key character strings, a first character string and a second character string; generating a first integer and a second integer based on: a preset base number, positions of characters included in the first and second character strings; determining a node segment based on the first and second integers, the node segment being associated with a node segment integer; converting the node segment integer to a node segment character; and generating an extraction statement associated with a thread for the node segment character converted from the node segment integer. The extraction (Continued)

statement can then be transmitted to a database when the thread is executed.

20 Claims, 12 Drawing Sheets

(58) Field of Classification Search
USPC .......................................................... 707/756
See application file for complete search history.

(56) References Cited

U.S. PATENT DOCUMENTS

| | | | | |
|---|---|---|---|---|
| 8,554,602 | B1* | 10/2013 | Zohar | G06Q 30/0251 705/7.33 |
| 2004/0015478 | A1 | 1/2004 | Pauly | |
| 2009/0187599 | A1 | 7/2009 | Bruso et al. | |
| 2010/0287171 | A1* | 11/2010 | Schneider | G06F 16/9014 707/759 |
| 2010/0332448 | A1* | 12/2010 | Holenstein | G06F 16/2365 707/615 |
| 2011/0022611 | A1* | 1/2011 | Yorke | G06F 9/4493 707/756 |
| 2012/0317134 | A1 | 12/2012 | Bourbonnais et al. | |
| 2012/0324240 | A1* | 12/2012 | Hattori | G06F 21/6227 713/189 |
| 2013/0086344 | A1* | 4/2013 | Kawada | G06F 11/2064 711/162 |
| 2014/0056301 | A1* | 2/2014 | Hu | H04L 69/22 370/392 |
| 2014/0157439 | A1 | 6/2014 | Ayzenshtat et al. | |

FOREIGN PATENT DOCUMENTS

| | | |
|---|---|---|
| CN | 103326730 A | 9/2013 |
| CN | 103488684 A | 1/2014 |
| CN | 103778138 A | 5/2014 |

OTHER PUBLICATIONS

First Chinese Search Report Issued by the State Intellectual Property Office of People's Republic of China in corresponding Chinese Application No. 2015102506811, dated Jan. 12, 2019.

* cited by examiner

400

---

Extract, from primary key character strings, a first character string and a second character string. The first character string being associated with a maximum ASCII code among the primary key strings, and the second character string being associated with a minimum ASCII code value among the primary key character strings — 1001

↓

Generate a first integer and a second integer based on a preset base number, the positions of characters in the first and second character strings, and the ASCII code value associated with the characters — 1002

↓

Calculate a numeric range based on the first and second integers, and determine whether the numeric range can be divided into a preset number of segments of equal length with zero remainder — 1003

↓

Perform an accumulation operation based on one of the first and second integers, and the segment lengths, to obtain an integer that corresponds to a segment node obtained by dividing the numeric range. — 1004

↓

Convert the numeric values of each segment node back to a set of ASCII codes, and a character string that correspond to the set of ASCII codes, generate an extraction statement including the character string for each of the segment node, and associate each extraction statement with a thread — 1005

- 2001: Extract, from primary key character strings, a first character string and a second character string. The first character string being associated with a maximum ASCII code among the primary key strings, and the second character string being associated with a minimum ASCII code value among the primary key character strings

- 2002: Generate a first integer and a second integer based on a preset base number, the positions of characters in the first and second character strings, and the ASCII code value associated with the characters

- 2003: Calculate a numeric range based on the first and second integers, and perform an integer division of the numeric range by a preset number of segments to obtain a quotient for a first segment length, and then obtain a second segment length by adding one to the first segment length.

- 2004: Perform an accumulation operation based on one of the first and second integers, and the segment lengths, to obtain an integer that corresponds to a segment node obtained by dividing the numeric range.

- 2005: Convert the numeric values of each segment node back to a set of ASCII codes, and a character string that correspond to the set of ASCII codes, generate an extraction statement including the character string for each of the segment node, and associate each extraction statement with a thread

FIG. 11

METHOD AND APPARATUS FOR MULTITHREADING EXTRACTION OF DATA FROM A DATABASE

CROSS-REFERENCE TO RELATED APPLICATION

This application is based upon and claims priority to Chinese Patent Application No. 201510250681.1, filed May 15, 2015, the entire contents of which are incorporated herein by reference.

TECHNICAL FIELD

The present disclosure generally relates to the field of computer technology and, more particularly, to a method and an apparatus for multithreading extraction of data from a database.

BACKGROUND

In the era of big data, data are typically constantly moved around to maximize value. To construct an enterprise's data warehouse and business intelligence, it is common to synchronously extract data stored on various RDBMSs (relational databases such as, for example, MySQL™, Oracle™, PostgreSQL™, etc.) to an offline storage and computing platform for unified processing by, for example, Hadoop™ in an open source community, Open Data Processing Service (ODPS) by Alibaba™ Group, etc., as shown in FIG. 1. Also, as shown in FIG. 2, data can also be migrated between different online systems (for example, between MySQL to Oracle), as shown in FIG. 2.

As an illustrative example, a MySQL table includes 100 million lines of data. To extract certain information from such a huge volume of data, for fast synchronization, multi-threading extraction will be needed. Assume that a primary key for the information extraction is associated with a specific name, with the specific name having a value range between "aa" and "zz," and the range is divided into three segments, as shown in FIG. 3. For multi-threading extraction of data, two segment nodes within the value range between "aa" and "zz" can be acquired. Based on the segmentation, character strings can then be generated for multithreading data extraction. Under existing technologies, the character strings (e.g., "aa" and "zz") can be converted to minimal numbers to create a value range to be segmented. The value range can then be divided into segments of equal length to obtain the segment nodes. Based on the range segments, a plurality of extraction statements can be generated, which can then be used for multithreading data extraction.

There are certain problems with such an arrangement.

First, when converting a character string to a minimal number (e.g., using BigDecimal representation), exceptions can result, which can lead to failure in range segmentation, and the associated data extraction.

Second, to avoid exceptions in conversion operation of the character string, an adaptive algorithm can be selected in which approximate processing (for example, rounding-off) can be performed. But approximate processing can destroy the precise mapping between a character string and the minimum number, and the character string cannot be precisely converted back from the minimum number. Further, the character string to be converted from a minimum number may have a length restriction, which can also destroy the precise mapping. As a result, wrong data can be extracted due to character strings that do not correspond to the primary key strings being used for the multithreading extraction.

Moreover, it is necessary to take 65536 as a base number in the process of converting an alphabetic character string to minimal numbers. Since the value range of characters covers basically all European and American characters and most Asian characters, the minimum numbers may be mapped to non-ASCII (American Standard Code for Information Interchange) characters.

In addition, not all character strings can be converted to minimum numbers for segmentation. For example, such conversion is not suitable for an integer type/time type in the RDBMS and the like.

Accordingly, there is a need for a method and an apparatus for multithreading extraction of data from a database that can facilitate efficient, accurate and stable transmission of data between databases.

SUMMARY OF INVENTION

As discussed above, under current technologies, when generating value range segments for a primary key character string using minimum numbers, exceptions and imprecision can occur. Embodiments of the present disclosure can provide a more stable and precise generation of character string value range segments, which can then facilitate efficient, accurate and stable multithreading extraction of data from a database, as well as transmission of that data between databases.

To solve the problems under the current technology, embodiments of the present disclosure provide a method of multithreading extraction of data from a database. The method comprises: acquiring a set of primary key character strings, the primary key character strings being uniquely associated with the data to be extracted from the database; extracting, from the primary key character strings, a first character string and a second character string, the first character string being associated with a maximum value among the primary key strings, and the second character string being associated with a minimum value among the primary key character strings; generating a first integer and a second integer based on: a preset base number, positions of characters included in the first and second character strings; determining a node segment based on the first and second integers, the node segment being associated with a node segment integer; converting the node segment integer to a node segment character; generating an extraction statement for the node segment character converted from the node segment integer; and associating the extraction statement with a thread. The extraction statement can then be transmitted to the database to extract portions of the data when the thread is executed In some embodiments, generating the first and second integers comprises: generating one or more first products by multiplying each value associated with each character of the first character string with the base number raised to a power according to a position of the each character in the first character string; determining the first integer based on a summation of the first products; generating one or more second products by multiplying each value associated with each character of the second character string with the base number raised to a power according to a position of the each character in the second character string; and determining the second integer based on a summation of the second products.

In some embodiments, the association between the values and the characters is based on American Standard Code for Information Interchange (ASCII), and wherein the base number is set based on a range of values defined under ASCII.

In some embodiments, converting the node segment integer to the node segment character comprises: performing successive division on the node segment integer to generate a quotient and a remainder; and converting the remainder to the node segment character.

In some embodiments, the base number is set based on a combined maximum value and a combined minimum value, the combined maximum value being associated with a character among the characters included in the first and second character strings, the combined minimum value being associated with a character among the characters included in the first and second character strings.

In some embodiments, converting the node segment integer to the node segment character comprises: performing successive division on the node segment integer to generate a quotient and a remainder; generating a second integer based on the remainder and the combined minimum value; and converting the second integer to the node segment character.

In some embodiments, determining the node segment comprises: determining whether a remainder of a division of a numeric range by a predetermined number of node segments is zero.

In some embodiments, determining the node segment comprises: responsive to determining that a remainder of a division of a numeric range by a predetermined number of node segments is not zero: determining a first segment length based on an integer division of the numeric range by the predetermined number of node segments; determining a second segment length based on the first segment length; and determining a first number of node segments associated with the first segment length and a second number of node segments associated with the second segment length, a sum of the first and second number of node segments being equal to the predetermined number of node segments.

In some embodiments, determining the node segment comprises: determining whether the numeric range is smaller than the predetermined number of node segments; and upon determining that the numeric range is smaller than the predetermined number of node segments, adjusting the predetermined number of node segments; wherein the division of the numeric range is by the adjusted predetermined number of node segments.

Embodiments of the present disclosure also provide a non-transitory computer readable medium storing instructions that are executable by one or more processors to cause the one or more processors to execute the aforementioned method of multithreading extraction of data from a database.

Embodiments of the present disclosure further provide a system for multithreading extraction of data from a database. The system comprises: a memory device that stores a set of instructions; and a hardware processor configured to execute the set of instructions to: acquire a set of primary key character strings, the primary key character strings being uniquely associated with the data to be extracted from the database; extract, from the primary key character strings, a first character string and a second character string, the first character string being associated with a maximum value among the primary key strings, and the second character string being associated with a minimum value among the primary key character strings; generate a first integer and a second integer based on: a preset base number, positions of characters included in the first and second character strings; determine a node segment based on the first and second integers, the node segment being associated with a node segment integer; convert the node segment integer to a node segment character; generate an extraction statement for the node segment character converted from the node segment integer; and associate the extraction statement with a thread. The extraction statement can then be transmitted to the database to extract portions of the data when the thread is executed.

Compared with current technologies, embodiments of the present disclosure can provide the following advantages:

1. Embodiments of the present disclosure provide value range segmentation for any ASCII character strings. Using power multiplication and addition, two character strings that define a value range of primary key name can be precisely mapped to two integers, which define a numeric range. Value range segments can then be determined such that the numeric range can be equally divided, and the segmentation can be precise. Besides, since the conversion uses a base number of 128, the segmentation result can be limited to the 128 ASCII characters, therefore mapping to non-ASCII characters can be avoided.

2. Embodiments of the present disclosure also use successive division to convert the integers back to ASCII characters, such that the integers are precisely mapped to the ASCII characters. As a result, the loss of precision using minimum numbers under the current technologies can be avoided.

3. Embodiments of the present disclosure can also use reduced base numbers for the aforementioned conversions using power multiplication and addition. The reduced base numbers can correspond to a number between the maximum ASCII code and the minimum ASCII code associated with the character strings. As a result, ASCII characters associated with ASCII codes 0-31 and 127, which are invisible characters (e.g., being a null character, a control character, etc.), and are typically not used for primary keys, will not be generated from the conversion. Such an arrangement can facilitate the readability of the character strings associated with the segment nodes, as well as validation.

4. Embodiments of the present disclosure also allow precise conversion of any character strings to integers which, after value range segmentation, can be converted precisely back to an original type associated with the character strings.

With embodiments of the present disclosure, embodiments of the present disclosure can provide a more stable and precise generation of character string value range segments, which can then facilitate efficient, accurate and stable multithreading extraction of data from a database, as well as transmission of that data between databases.

It is to be understood that both the foregoing general description and the following detailed description are exemplary and explanatory only and are not restrictive of the disclosed embodiments, as claimed.

BRIEF DESCRIPTION OF THE DRAWINGS

FIG. 4 is a flowchart illustrating an exemplary method of generating extraction statements from a set of primary key character strings, according to embodiments of the present disclosure.

FIG. 11 is a flowchart illustrating an exemplary method of generating extraction statements from a set of primary key character strings, according to embodiments of the present disclosure.

DESCRIPTION OF THE EMBODIMENTS

Figure 1:
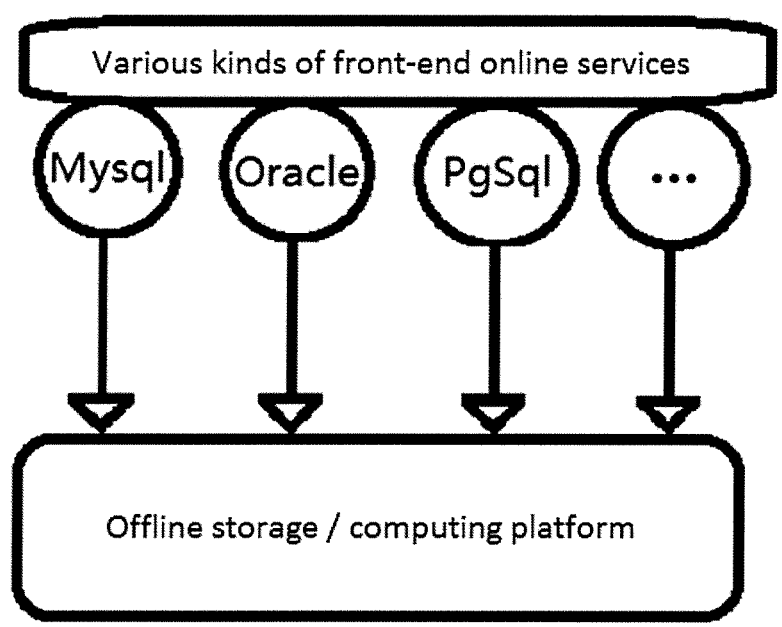
FIG. 1 is a diagram illustrating a synchronization process of offline data under current technologies.
Figure 2:
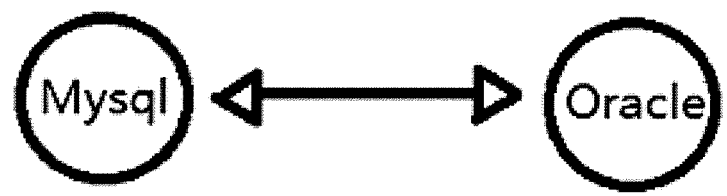
FIG. 2 is a diagram illustrating a migration process of data under current technologies.
Figure 3:
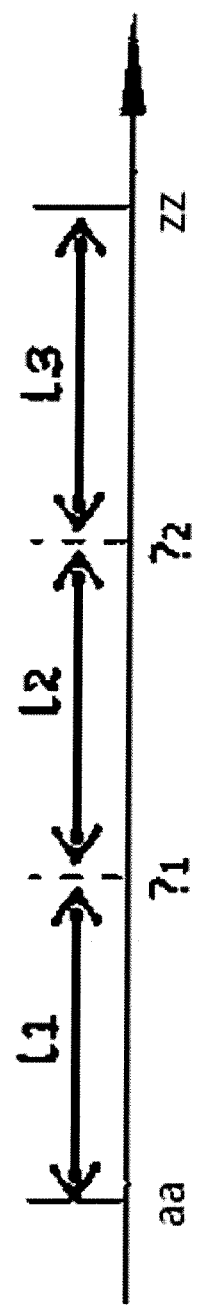
FIG. 3 is a diagram illustrating a method of generating extraction statements from a set of primary key character strings for multithreading extraction of data from a database under current technologies.

To solve the problems under the current technology, embodiments of the present disclosure provide a method and an apparatus for acquiring network status data.

Reference will now be made in detail to methods and specific implementations that seek to overcome the foregoing shortcomings of current systems and methods for facilitating the login of an account. Examples of these implementations are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Reference is now made to FIG. 4, which illustrates an exemplary method 400 of generating extraction statements from a set of primary key character strings, according to embodiments of the present disclosure. The method can be performed by, for example, a system (e.g., a computer processor) configured to generate extraction statements, from a set of primary key strings associated with data to be extracted from a database, for multithreading extraction of the data from the database. As shown in FIG. 4, method 400 comprises steps 1001 to 1005.

In Step 1001, the system extracts, from the primary key character strings, a first character string and a second character string. The first character string can be associated with a maximum ASCII code among the primary key strings, and the second character string can be associated with a minimum ASCII code value among the primary key character strings.

In some embodiments, the multithreading data extraction is for a data synchronization process. For example, in a case where a data table that includes multiple lines of data is to be synchronized, each line of data can be extracted for processing. The line of data can be associated with the primary key character strings in step 1001. The primary key character strings typically comprises one or more character strings included in the data table, and a line of data including these character strings is uniquely associated with the primary key character strings. Therefore, the primary key character strings can be used to uniquely identify one line of data in the data table for extraction.

Although a data table is provided as an example, it is understood that embodiments of the present disclosure are not limited to extraction of data from a data table, nor is it limited to extraction of lines of data. Embodiments of the present disclosure are applicable to extraction of data from any kind of database organized under any format.

Since the primary key character strings are uniquely associated with the data lines and can be used to ensure integrity of extracted data, using the primary key character strings to extract data from a database can accelerate an operating speed of the database. Moreover, by determining the maximum and minimum ASCII code values associated with the primary key character strings, the string characters can be converted into a numeric range, which can then be segmented. The segments can be uniquely associated with the line of data to be extracted and can be used for multithreading extraction of the line of data. With such an arrangement, the segmentation of primary key character strings can be done in a more intuitive manner, while improving the precision of data extraction.

For the following discussion, as an illustrative example, it is assumed that a primary key of a certain data line contains multiple character strings. The first character string with a maximum ASCII code value is "8cdB", and the second character string with a minimum ASCII code value is "2E4e".

In step 1002, based on a preset base number, the positions of characters in the first and second character strings, and the ASCII code value associated with the characters, the system can generate a first integer and a second integer using power addition and multiplication.

With such an arrangement, the likelihood of a scenario where the integer becoming too small for subsequent processing (or leading to exceptions), such that the integer cannot be converted back to the character strings, can be minimized. As discussed before, this can happen with the character strings are converted to minimum numbers. As a result, the first and second integers generated in step 1002 can be mapped precisely to any ASCII character strings, and the likelihood of failure of segmentation of primary key (and the ensuing multithreading extraction of data) can be minimized.

The conversion process in step 1002 can further comprise: associating a power of a base number based on a position of a character in the first (or second) character string, multiplying each base number (raised to the associated power) with the ASCII code value associated with the character, and summing the terms to generate the first and second integers. Formula 1 below illustrates an example of the aforementioned conversion process:

$$C_0 \times B^0 + C_1 \times B^1 + \ldots + C_{n-1} \times B^{n-1} \quad \text{Formula 1}$$

In Formula 1, $C_0 \sim C_{n-1}$ are ASCII code values associated with each character in the character strings (e.g., first and second character strings) to be converted, B is the base number, and 0-n are powers that correspond to the positions of the character in the character string.

Using the example shown in step 1001, the first character string is "8cdB", the second character string is "2E4e". The ASCII codes (in decimal) for character '8' is 56, character 'c' (lowercase) is 99, character '2' is 50, 'E' (uppercase) is 69, etc. Assume also that the base number B is 128. The conversions of the first and second character strings according to Formula 1 are illustrated as follows:

A conversion and calculation process of the character string 8cdB is:

$$66 \times 128^0 + 98 \times 128^1 + 99 \times 128^2 + 56 \times 128^3 = 119075138$$

A conversion process of the character string 2E4e is $$101 \times 128^0 + 52 \times 128^1 + 69 \times 128^2 + 50 \times 128^3 = 105994853.$$

In step 1003, the system can calculate a numeric range based on the first and second integers, and determine whether the numeric range can be divided into a preset number of segments of equal length with zero remainder. In a case where the remainder is zero, the system can set the quotient as the segment length. The number of segments can be preset independently from the first and second integers.

On the other hand, if the remainder is non-zero, the numeric range can still be divided into the preset number of segments, but with segments of two different lengths.

The calculation of the numeric range from the first and second integers can be according to Formula 2 as illustrated below:

$$\Delta = \text{big} - \text{small} \quad \text{Formula 2}$$

In Formula 2, "big" may be the larger of the first and second integers (herein after, "bigger integer") of step 1002, and "small" may be the smaller of the first and second integers (herein after, "smaller integer"). $\Delta$ may represent a numeric range between the first and second integers.

Figure 5:
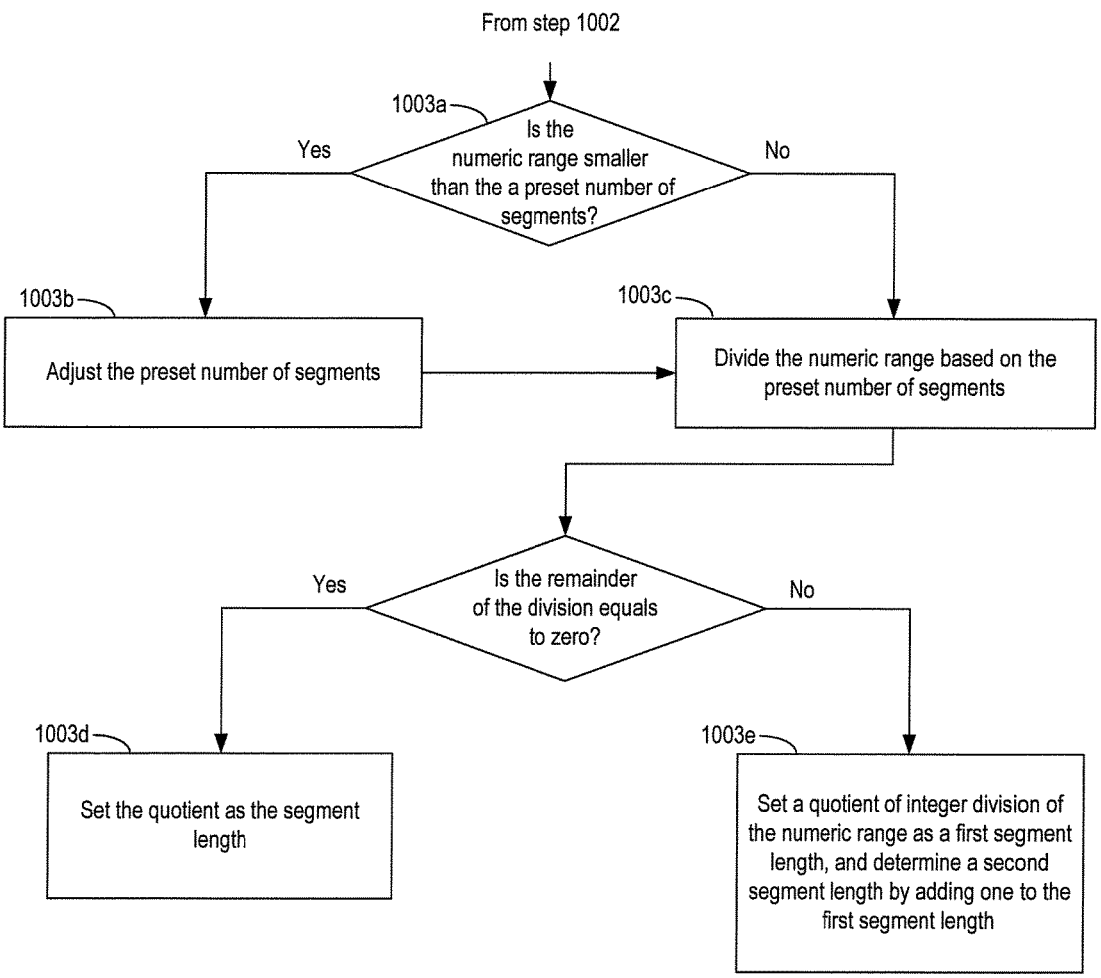
FIG. 5 illustrates exemplary sub-steps of the exemplary method of FIG. 4, according to embodiments of the present disclosure.

Reference is now made to FIG. 5, which illustrates exemplary sub-steps of step 1003 of method 400 of FIG. 4. As shown in FIG. 5, step 1003 of method 400 can comprise steps 1003a-1003e.

In step 1003a, the system determines whether the numeric range is smaller than the preset number of segments. The determination can be based on, for example, simulating a segmentation of the numeric range using the preset number of segments, comparing a value of the preset number against a value of the numeric range, etc.

If the numeric range is smaller than the preset number of segments, the system may proceed to step 1003b to adjust the preset number of segments. The adjustment may include, for example, adjusting an upper limit of the preset number of segments according to the numeric range, such as adjusting the preset number to become equal to a value of the numeric range. The preset number typically is larger than or equal to one.

In some embodiments (not shown in FIG. 5), the system may also determine not to adjust the preset number of segments, and method 400 may terminate.

After adjusting the preset number of segments (in step 1003b), or determining that the numeric range is at least equal to the preset number of segments (in step 1003a), the system may proceed to step 1003c, to divide the numeric range into equal segments based on the preset number of segments. The system then determines whether the result of dividing (the quotient) is an integer.

If in step 1003c the quotient is an integer, the system may proceed to step 1003d and set the quotient as the segment length, according to Formula 3 as illustrated below:

$$\text{step} = \Delta / N \quad \text{Formula 3}$$

In Formula 3, "step" represents the segment length, and N represents the preset number of segments.

If in step 1003c the quotient is not an integer, the system may proceed to step 1003e. In step 1003e, the processor may perform an integer division of the numeric range by the preset number of segments to obtain a quotient for obtain a first segment length, and then obtain a second segment length by adding one to the first segment length. The system may then obtain a first number of segments as a quotient by dividing the numeric range by the first segment length, and obtain a second number of segments as a remainder by dividing the numeric range by the second segment length, wherein a sum of the first and second numbers equals the preset number of segments.

For example, as illustrated by Formulae 3 and 4:

$$\text{step} = \Delta / N \quad \text{Formula 3}$$

$$r = \Delta \% N \quad \text{Formula 4}$$

The quotient ("step") in Formula 3, obtained by integer division, can represent the first segment length, and N can represent the preset number of segments. The remainder ("r") in Formula 4 can be the second number of segments, while step+1 can be the second segment length, and the first number of segments can be a difference between N and r (N−r).

In addition, in the previous step 1003c, the system can also perform a simulated segmentation of the numeric range using the preset number of segments. If a result of the simulated segmentation does not yield an integer, the system can also perform the aforementioned operation in step 1003e to perform an integer division to obtain a quotient for a first segment length, and then obtain a second segment length by adding one to the first segment length. The system may then obtain a first number of segments by dividing the numeric range using the first segment length, and a second number of segments by dividing the numeric range using the second segment length. The system can also use the integer portion of the result of simulated segmentation as a segment length. After dividing a first portion of the numeric range using the segment length into the preset number of segments, the system can divide the remaining portion of the numeric range equally among the preset number of segments, by adding one to each.

The advantage of adding one to the first segment length to obtain the second segment length is to ensure that the segment lengths are integers, and to maximize a degree of uniformity in the segmentation.

Referring back to FIG. 4, after determining one or more segment lengths, the system can proceed to step 1004 to perform an accumulation operation based on one of the first and second integers, and the segment lengths, to obtain an integer that corresponds to a segment node obtained by dividing the numeric range. Step 1004 includes sub-steps 1004a and 1004b.

Figure 6:
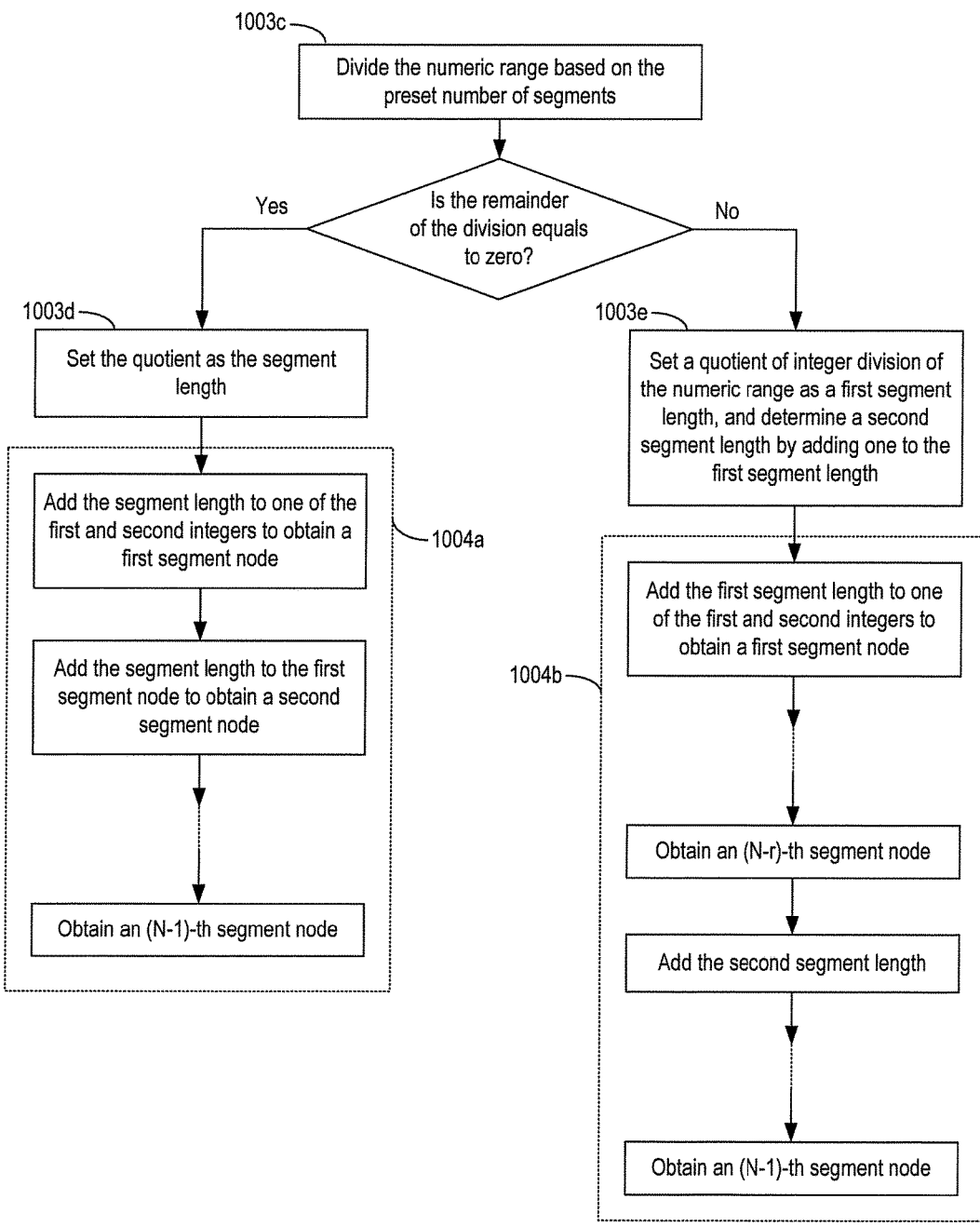
FIG. 6 illustrates exemplary sub-steps of the exemplary method of FIG. 4, according to embodiments of the present disclosure.
Figure 7:
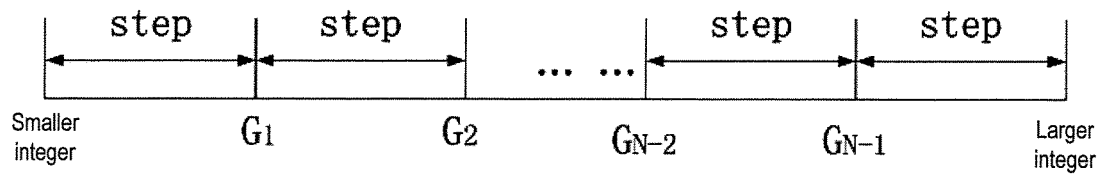
FIG. 7 is a diagram illustrating segment nodes and associated character string generation using exemplary methods of the present disclosure.

As shown in FIG. 6, after step 1003d where the system sets an integer quotient (obtained by dividing the numeric range by the preset number of segments) as the segment length, the system can proceed to step 1004a, to perform an accumulative summation operation based on the smaller integer and the segment length to obtain the segment nodes. For example, as illustrated in FIG. 7 and Formula 5 below, an integer corresponding to a first segment node (G1) can be obtained by adding the segment length to the smaller integer, an integer corresponding to a second segment node (G2) can be obtained by adding the segment length to the first segment node, and so on:

$$G_1 = \text{small} + \text{step}$$
$$G_2 = G_1 + \text{step}$$
$$\ldots$$
$$G_{N-1} = G_{N-2} + \text{step}$$

Formula 5

In Formula 5, $G_1 \sim G_{N-1}$ are integers (herein after, "segment node integers") that correspond to the segment nodes, "step" correspond to the segment length obtained as an integer quotient by dividing the numeric range by the preset number of segments, obtained in step 1003d.

In some embodiments, the segment nodes can also be obtained in a different operation from above. For example, an accumulative subtraction operation can also be performed on the bigger integer by subtracting the segment length from the bigger integer to obtain a first segment node, and subtracting the segment length from the first segment node to obtain the second segment node, etc.

Figure 8:
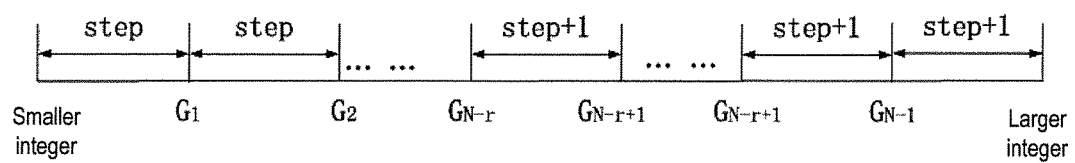
FIG. 8 is a diagram illustrating segment nodes and associated character string generation using exemplary methods of the present disclosure.

On the other hand, after step 1003e where the system determines a first segment length and a second segment length, the system can proceed to step 1004b to perform an accumulative summation operation based on the smaller integer and the first and second segment lengths. As shown in FIG. 8 and Formula 6 below, an integer corresponding to a first segment node can be obtained by adding the first segment length to the smaller integer, an integer corresponding to a second segment node can be obtained by adding the first segment length to the first segment node, and so on, until an (N−r)th segment node is obtained, for a first set of segment nodes. Here, a value of N−r can be equal to the first number of segments, and N is the preset number of segments, as determined in step 1003e.

Thereafter, an integer corresponding to an (N−r+1)th segment node can be obtained by adding the second segment length to the (N−r)th segment node, and an integer corresponding to an (N−r+2)th segment node can be obtained by adding the second segment length to the (N−r+1)th segment node, and so on, until an (N−1)th segment node is obtained, for a second set of segment nodes. Here, a value of r is equal to the second number of segments, as determined in step 1003e:

$$G_1 = \text{small} + \text{step}$$
$$G_2 = G_1 + \text{step}$$
$$\ldots$$

Formula 6

$$G_{N-r} = G_{N-r-1} + \text{step}$$
$$G_{N-r+1} = G_{N-r} + \text{step} + 1$$
$$G_{N-r+2} = G_{N-r+1} + \text{step} + 1$$
$$\ldots$$
$$G_{N-1} = G_{N-2} + \text{step} + 1$$

In Formula 6, $G_1 \sim G_{N-1}$ are integers corresponding to a first set of segmentation nodes till the (N−1)th segment node, "step" represents the first segment length, "step+1" represents the second segment length.

In some embodiments, the segment nodes can also be obtained in a different operation from above. For example, a first set of segment nodes can be obtained by accumulative summation of the second segment length to the smaller integer to obtain the first to the (r−1)th segment nodes. The second set of segment nodes can then be obtained by accumulative summation of the first segment length to the r-th segment node to obtain the remaining N−r−1 segment nodes.

Moreover, in some embodiments, the segment nodes can also be obtained by accumulative subtraction. For example, a first set segment nodes can be obtained by accumulative subtraction of the second segment length from the bigger integer to obtain the first r segment nodes. The second set of segment nodes can then be obtained by accumulative subtraction of the first segment length from the (r+1)th segment node to obtain the remaining N−r−1 segment nodes. Further, a first set segment nodes can also be obtained by accumulative subtraction of the first segment length from the bigger integer to obtain the first (N−r) segment nodes. The second set of segment nodes can then be obtained by accumulative subtraction of the second segment length from the (N−r+1)th segment node to obtain the remaining r−1 segment nodes.

The following is an illustration of the operations of method 400 on first character string "8cdB" and second character string "2E4e", which yields a numeric range is 13080285, and the preset number of segments is 6.

First, applying Formulae 3 and 4, with N equals to 6, the system may determine that "step" in formula 3, after performing an integer division of the numeric range by N (13080285/6), equals 2180047. The system may also determine that "r" in formula 4, which is a remainder of the division (13080285%6), equals 3. Therefore, when performing step 1003e of method 400, the system may determine a first segment length of 2180047, and a second segment length of 2180048 (by adding one to the first segment length). The system may also determine the second number of segments equals to r, which is 3, and the first number of segments equals to N−r, which is also 3.

Applying Formula 6, the system may determine the segment node integers (G) of the five nodes as follows:

$$G_1 = \text{small} + \text{step} + 1 = 108174901$$

$$G_2 = G_1 + \text{step} + 1 = 110354949$$

$$G_3 = G_2 + \text{step} + 1 = 112534997,$$

$$G_4 = G_3 + \text{step} = 114715044$$

$$G_5 = G_4 + \text{step} = 116895091.$$

Referring back to FIG. 4, after determining the segment nodes in step 1004, the system may proceed to step 1005 to convert the numeric values of each segment node back to a set of ASCII codes, and a character string that correspond to the set of ASCII codes. The system can then generate an extraction statement including the character string for each of the segment node, and then associate each extraction statement with a thread. The extraction statements can then be transmitted to a database when the associated thread is executed to extract portions of data, thereby enabling multithreading extraction of data.

In some embodiments, the conversion can include using successive division to convert the numeric value to an ASCII code. Based on an ASCII table, a character that corresponds to an ASCII code (and a set of character strings that corresponds to a set of ASCII codes) can then be determined.

Figure 9:
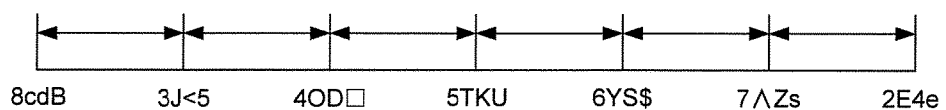
FIG. 9 is a diagram illustrating segment nodes and associated character string generation using exemplary methods of the present disclosure.

For example, as shown in FIG. 9, using the illustrative examples above with a first character string "8cdB" and a second character string "2E4e", and the range being divided into 6 segments, the following range segments, expressed in terms of character strings, can be obtained: ["8cdB", "3J<5"], ["3J<5", "4OD☐"], ["4OD☐", "5TKU"], ["5TKU", "6YS$"], ["6YS$", "7∧Zs"], and ["7∧Zs", "2E4e"]. In this illustrative example, 'o' indicates an invisible ASCII character (e.g., null and control characters).

In some embodiments, the base number used in steps 1002 and 1005 can be preset. The presetting can occur before or after step 1001, and/or before step 1002.

As discussed before, characters associated with ASCII code values within 0-31 and 127 are invisible null characters and control characters. As shown in the illustrative example above, the ASCII character strings converted from the segment node numbers can include such invisible characters. As a result, the converted strings are not readable, and debugging can be difficult as a result. Embodiments of the present disclosure provide the following methods to reduce the likelihood of generating invisible characters, by configuring the base number.

First method: The base number can be set based on the total number of characters that ASCII codes can represent.

Generally, the total number of basic characters that ASCII codes can represent is 128. By setting the base number to 128, a character string converted from an integer associated with a segment node will be associated with one of the 128 ASCII codes, therefore preventing the generation of non-ASCII characters from the conversion process.

Second method: The base number can be set based on a minimum ASCII code and a maximum ASCII code corresponding to the characters of the first and second character strings, which can lead to a smaller number than 128 being used as the base.

In particular, for the first character string, a first minimum ASCII code and a first maximum ASCII code for the characters included in the first character string can be determined. Further, for the second character string, a second minimum ASCII code and a second maximum ASCII code for the characters included in the second character string can also be determined.

And then, as shown in Formula 7 below, a combined ASCII minimum code, which is the smaller of the first and second minimum ASCII codes, and a combined ASCII maximum code, which is the larger of the first and second maximum ASCII codes, can be determined.

$$Max=max\{Max1, Max2\}$$

$$Min=min\{Min1, Min2\} \quad \text{Formula 7}$$

In Formula 7, Max1 and Max2 are respectively the first maximum ASCII code and the second maximum ASCII code, Min1 and Min2 are respectively the first minimum ASCII code and the second minimum ASCII code. Max and Min are respectively the combined maximum and combined minimum ASCII codes.

The base number can be set based on the combined maximum ASCII codes and combined minimum ASCII codes according to Formula 8 below:

$$Max-Min+1 \quad \text{Formula 8}$$

In Formula 8, Max and Min are respectively the combined maximum and combined minimum ASCII codes.

The base numbers generated as described above can then be used for operations in steps 1001-1004 of method 400, the details of which are not repeated here.

Using the illustrative examples of first and second character strings above, a base number generated using the second method can be as follows:

The characters of the first character string 8cdB can be mapped to a set of ASCII codes as {56, 99, 98, 96}. The characters of the second character string 2E4e can be mapped to a set of ASCII codes as {50, 69, 52, 101}. Applying Formula 7 above, Max is the combined maximum among the ASCII codes of the first and second character strings, which is the set {56, 99, 98, 66, 50, 69, 52, 101}. The Max is therefore 101. Also, Min is the combined minimum among the ASCII codes within the set {56, 99, 98, 66, 50, 69, 52, 101}. The Min is therefore 50.

Apply Formula 8 above, the base equals Max−Min+1, which is 52. As a result, compared with the first method where 128 is used as the base, a reduced base is generated using the second method.

Using a base of 52, the conversion of the first and second character strings in step 1002 can be illustrated as follows:

Character string 8cdb can be converted as follows:

$$66 \times 52^0 + 98 \times 52^1 + 99 \times 52^2 + 56 \times 52^3 = 8146906$$

Character string 2E4e can be converted as follows:

$$101 \times 52^0 + 52 \times 52^1 + 69 \times 52^2 + 50 \times 52^3 = 7219781$$

The bigger integer ("big"):
big=8146906
The smaller integer ("small"):
small=7219781
Further, in step 1003, a numeric range between the larger and the smaller integers can be determined:

$$\Delta = big - small = 927125.$$

The range can be divided into segments. Suppose that the preset number of segments is 6 as above, applying Formulae 3 and 4:

$$step = 927125/6 = 154520$$

$$r = 927125\%6 = 5.$$

Therefore, the first segment length equals to the value of "step" which is 154520, and the second segment length equals step+1 which is 154521.

In accordance with step 1004, the segment node integers are generated as follows:

$$G_1 = small + step = 7374301$$

$$G_2 = G_1 + step + 1 = 7528822$$

$$G_3 = G_2 + step + 1 = 7683343$$

$$G_4 = G_3 + step + 1 = 7837864$$

$$G_5 = G_4 + step + 1 = 7992385$$

As discussed above, a base number generated from the first or the second method above can be applied the same way for character string conversions in steps 1001-1004. However, the operation of step 1005 may be different according to whether the first or the second method is used to generate the base number, as follows:

When the base number is set based on the total number of characters that the ASCII codes can represent (e.g., according to the first method), a segment node integer can be converted to a character string directly with successive division:

First, an integer division can performed by dividing a segment node integer (G) by the base number to obtain a first quotient and a first remainder. Second, the first quotient can be divided by the base number to obtain a second quotient and a second remainder. The process is repeated until a zero quotient is obtained, as illustrated in Formula 9 below:

$$C_0 = G \% B, A_0 = G/B$$
$$C_1 = A_0 \% B, A_1 = A_0/B$$
$$...$$
$$C_m = A_{m-1} \% B, A_m = A_{m-1}/B = 0$$

Formula 9

In Formula 9, G is a corresponding segmentation node, $C_0$~$C_m$ refer to a first remainder to an m-th remainder obtained by the aforementioned operations, $A_0$~$A_{m-1}$ are a first quotient to an m-th quotient, and B is the preset base number.

After obtaining the first to m-th remainders $C_0$~$C_m$, the remainders can be arranged in a reversed order as follows:

$$C_m C_{m-1} \ldots C_0$$

Each remainder can be converted to a character according to the ASCII code table, and a character string can be constructed.

Using the illustrative example above, the conversion of a segment node integer $G_1$, to a character string using base number of 128, in step 1004 of method 400, can be as follows:

$$C_0 = G_1 \% 128 = 53, A_0 = G_1/128 = 845116$$

$$C_1 = A_0 \% 128 = 60, A_1 = A_0/128 = 6602$$

$$C_2 = A_1 \% 128 = 74, A_2 = A_1/128 = 51$$

$$C_3 = A_2 \% 128 = 51, A_3 = A_2/128 = 0$$

Then a set of ASCII values $C_3C_2C_1C_0$ corresponding to the node are {51, 74, 60, 53}, and the corresponding character string can be "3J<5".

By using the same conversion method, ASCII value sets respectively obtained for the remaining four segment nodes are as follows: {52, 79, 68, 5}, {53, 84, 75, 85}, {54, 89, 83, 36}, and {55, 94, 90, 115}. The corresponding character strings can be respectively: "4OD☐", "5TKU", "6YS$", and "7∧Zs" as shown above in step 1005.

On the other hand, when the base number is set based on a combined minimum ASCII code and a combined maximum ASCII code corresponding to the characters of the first and second character strings, the following method can be used to convert the numbers back to character strings:

First, an integer division can performed by dividing a segment node integer (G) by the base number to obtain a first quotient and a first remainder. Second, the first quotient can be divided by the base number to obtain a second quotient and a second remainder. Each remainder is subtracted by one and added the combined minimum ASCII code to generate an integer. The process is repeated until a zero quotient is obtained, as illustrated in Formula 10 below:

A specific implementation process thereof is as Formula 10:

$$C_0 = G \% B - 1 + \text{Min}, A_0 = G/B$$
$$C_1 = A_0 \% B - 1 + \text{Min}, A_1 = A_0/B$$
$$...$$
$$C_m = A_{m-1} \% B - 1 + \text{Min}, A_m = A_{m-1}/B = 0$$

Formula 10

In Formula 10, G a segment node integer, $C_0$~$C_m$ are the first integer to an m-th integer generated from the remainders as described above, $A_0$~$A_{m-1}$ are the first quotient to the m-th quotient obtained by integer division, B is the preset base number, and Min is the combined minimum ASCII code.

After obtaining the first to m-th integers $C_0$~$C_m$, the integers can be arranged in a reversed order as follows:

$$C_m C_{m-1} \ldots C_0$$

Each integer can be converted to a character according to the ASCII code table, and a character string can be constructed.

Using the illustrative example above, the conversion of a segment node integer $G_1$, to a character string using base number of 52, in step 1004 of method 400, can be as follows:

Suppose that the first segment node integer $G_1$=7374301, Min=50, B=52

$$C_0 = G_1 \% 52 - 1 + \text{Min} = 74, A_0 = G_1/52 = 141813$$

$$C_1 = A_0 \% 52 - 1 + \text{Min} = 58, A_1 = A_0/52 = 2727$$

$$C_2 = A_1 \% 52 - 1 + \text{Min} = 72, A_2 = A_1/52 = 52$$

$$C_3 = A_2 \% 52 - 1 + \text{Min} = 49, A_3 = A_2/52 = $$

$$C_4 = A_3 \% 52 - 1 + \text{Min} = 50, A_4 = A_3/52 = 0$$

The ASCII code values $C_4C_3C_2C_1C_0$ corresponding to the node are {50, 49, 72, 58, 74}, and the associated character string can be "21H:J".

With the same calculation method, the character strings corresponding to the remaining four segment nodes are respectively: "22MB3", "23RFP", "24WQ9" and "25\XV", as shown in FIG. 10.

Figure 10:
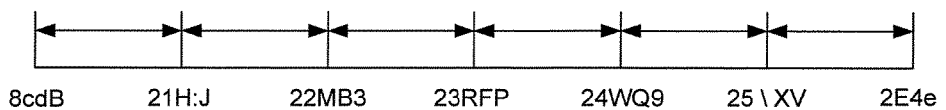
FIG. 10 is a diagram illustrating segment nodes and associated character string generation using exemplary methods of the present disclosure.

As can be seen in FIG. 10, none of the character strings corresponding to the segment nodes include any invisible character, and has better readability. Using the second method, as long as the primary key character strings do not include invisible characters, the resulting segment nodes also will not include invisible characters. As a result, the readability of the segment nodes can be improved, which can also facilitate debugging and extraction of data.

FIG. 11 is a flowchart illustrating an exemplary method 1100 of generating extraction statements from a set of primary key character strings, according to embodiments of the present disclosure. The method can be performed by, for example, a system (e.g., a computer processor) configured to generate extraction statements, from a set of primary key strings associated with data to be extracted from a database, for multithreading extraction of the data from the database. As shown in FIG. 11, method 1100 comprises steps 2001 to 2005.

In step 2001, the system extracts, from the primary key character strings, a first character string and a second character string. The first character string can be associated with a maximum ASCII code among the primary key strings, and the second character string can be associated with a minimum ASCII code value among the primary key character strings.

In step 2002, based on a preset base number, the positions of characters in the first and second character strings, and the ASCII code value associated with the characters, the apparatus can generate a first integer and a second integer using power addition and multiplication.

In step 2003, the system may determine a numeric range based on the first and second integers, and then divide the numeric range by a preset number of segment lengths. In a case where the remainder is non-zero, the system may perform an integer division of the numeric range by a preset number of segments to obtain a quotient for a first segment length, and then obtain a second segment length by adding one to the first segment length. In some embodiments, step 2003 can include at least a part of step 1003e of FIG. 6.

In step 2004, the system can perform an accumulation operation based on one of the first and second integers and the segment lengths, to obtain an integer that corresponds to a segment node obtained by dividing the numeric range. In some embodiments, step 2004 can include at least a part of step 1004b of FIG. 6.

In step 2005, the system can convert the numeric values of each segment node back to a set of ASCII codes, and a character string that correspond to the set of ASCII codes. The system can then generate an extraction statement including the character string for each of the segment node, and then associate each extraction statement with a thread. The extraction statements can then be transmitted to a database when the associated thread is executed to extract portions of data, thereby enabling multithreading extraction of data. In some embodiments, step 2005 can include at least a part of step 1005 of FIG. 4.

Figure 12:
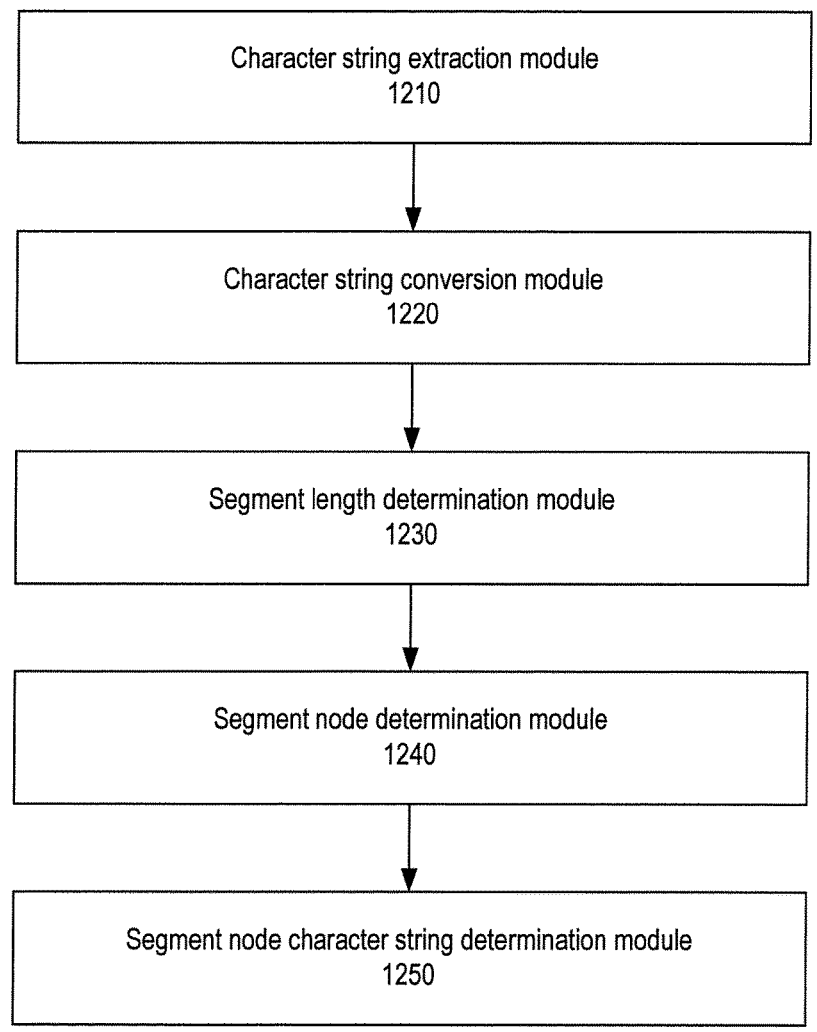
FIG. 12 is a block diagram illustrating an exemplary system for generating extraction statements from a set of primary key character strings, according to embodiments of the present disclosure.

FIG. 12 is a block diagram illustrating an exemplary system 1200 for generating extraction statements from a set of primary key character strings, according to embodiments of the present disclosure. As shown in FIG. 12, system 1200 may include a character string extraction module 1210, a character string conversion module 1220, a segment length determination module 1230, a segment node determination module 1240, and a segment node character string determination module 1250. In some embodiments, system 1200 can perform at least some of the steps of method 400 of FIG. 4.

In general, the word "module," as used herein, refers to logic embodied in hardware or firmware, or to a collection of software instructions, possibly having entry and exit points, written in a programming language, such as, for example, Java, Lua, Go, C or C++. A software layer can include multiple modules, and vice versa. Each software layer and module can be compiled and linked into an executable program, installed in a dynamic link library, or written in an interpreted programming language such as, for example, BASIC, Perl, or Python. It will be appreciated that software layers and modules can be callable from other modules, layers, or from themselves, and/or can be invoked in response to detected events or interrupts. Software layers and modules configured for execution on computing devices (e.g., a processor) can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The layers, modules or computing device functionality described herein are preferably implemented as software modules, but can be represented in hardware or firmware. Generally, the layers and modules described herein refer to logical layers and modules that can be combined with other layers and modules, or divided into sub-layers and sub-modules despite their physical organization or storage.

Referring back to FIG. 12, character string extraction module 1210 is configured to extract, from the primary key character strings, a first character string and a second character string. The first character string can be associated with a maximum ASCII code among the primary key strings, and the second character string can be associated with a minimum ASCII code value among the primary key character strings. In some embodiments, character string extraction module 1210 can perform at least a part of step 1001 of method 400.

Character string conversion module 1220 is configured to, based on a preset base number, the positions of characters in the first and second character strings, and the ASCII code value associated with the characters, generate a first integer and a second integer using power addition and multiplication. In some embodiments, character string conversion module 1220 can perform at least a part of step 1002 of method 400.

Segment length determination module 1230 is configured to calculate a numeric range based on the first and second integers, and divide the numeric range into a preset number of segments of equal length. In a case where the remainder is zero, the system can set the quotient as the segment length. In some embodiments, segment length determination module 1230 can perform at least a part of step 1003 of method 400.

Segment node determination module 1240 is configured to perform an accumulation operation based on one of the first and second integers, and the segment lengths, to obtain an integer that corresponds to a segment node obtained by dividing the numeric range. In some embodiments, segment node determination module 1240 can perform at least a part of step 1004 of method 400.

Segment node character string determination module 1250 is configured to convert the numeric values of each segment node back to a set of ASCII codes, and a character string that correspond to the set of ASCII codes. Segment node character string determination module 1250 can then generate an extraction statement including the character string for each of the segment node, and then associate each extraction statement with a thread. The extraction statements can then be transmitted to a database when the associated thread is executed to extract portions of data, thereby enabling multithreading extraction of data. In some embodiments, segment node character string determination module 1250 can perform at least a part of step 1005 of method 400.

Figure 13:
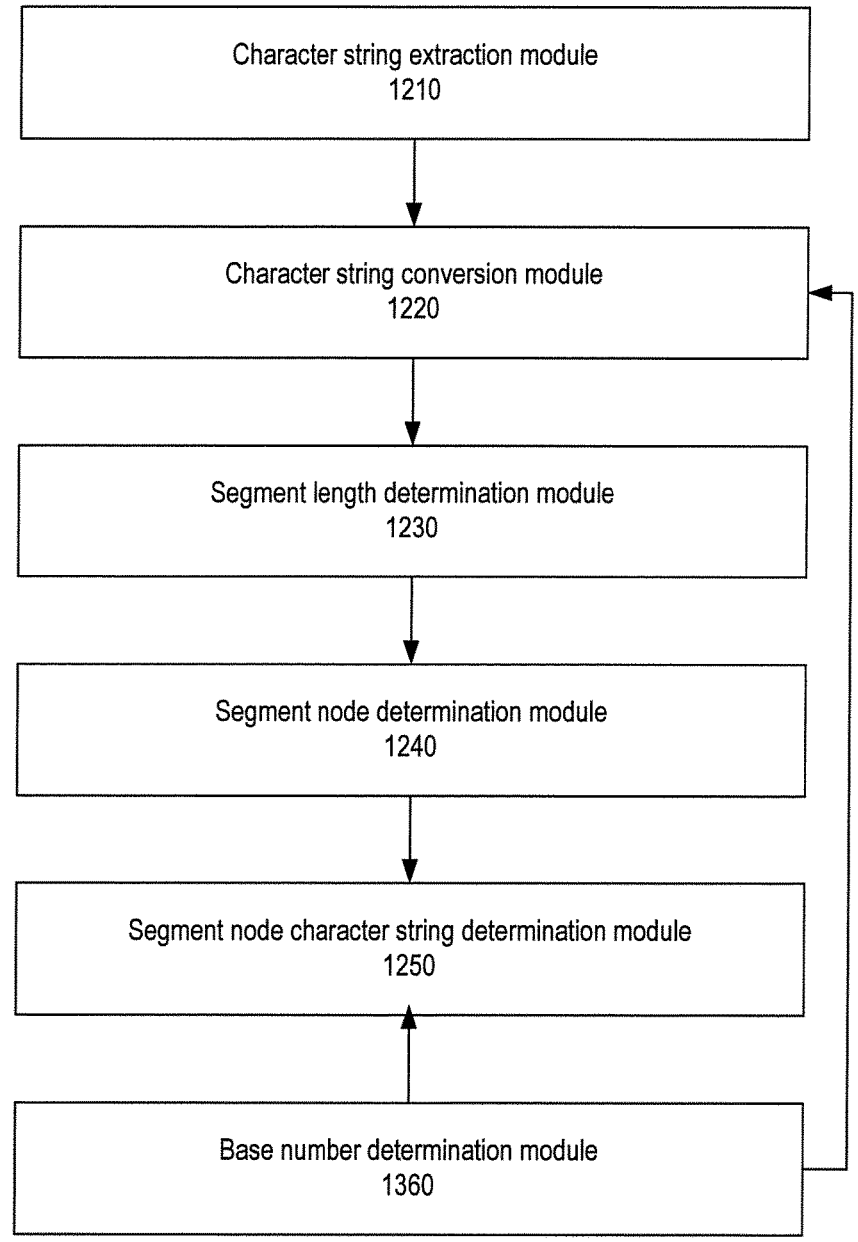
FIG. 13 is a block diagram illustrating an exemplary system for generating extraction statements from a set of primary key character strings, according to embodiments of the present disclosure.

FIG. 13 is a block diagram illustrating an exemplary system 1300 for generating extraction statements from a set of primary key character strings, according to embodiments of the present disclosure. As shown in FIG. 13, system 1300 can include character string extraction module 1210, character string conversion module 1220, segment length determination module 1230, segment node determination module 1240, segment node character string determination module 1250, and a base number determination module 1360, which can preset a base number for character string conversion module 1220 and segment node determination module 1240.

In some embodiments, base number determination module 1360 can set a base number based on the total number of characters that the ASCII codes can represent, or a base number based on combined maximum ASCII codes and combined minimum ASCII codes according to Formulae 7 and 8 above. In a case where the base number is set based on the total number of characters that the ASCII codes can represent, the conversion of ASCII codes back to character strings can be performed according to Formula 9. In a case where the base number is set based on combined maximum ASCII codes and combined minimum ASCII codes, the conversion of ASCII codes back to character strings can be performed according to Formula 10, as discussed above.

Figure 14:
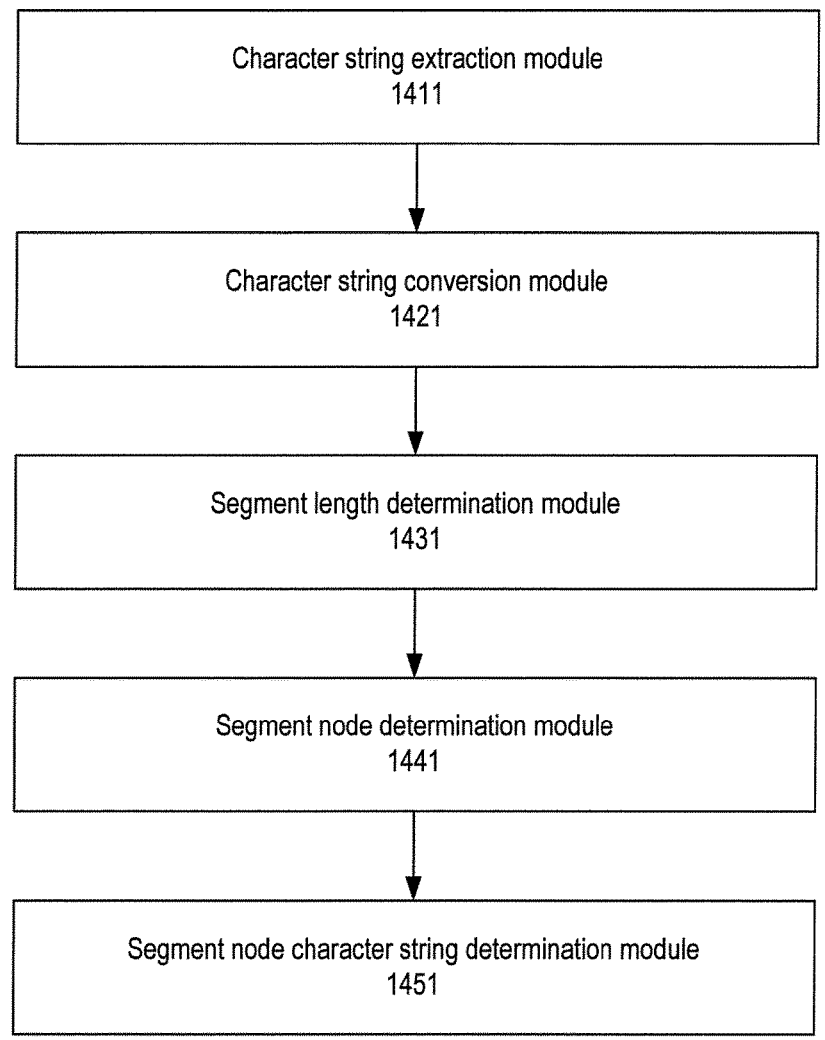
FIG. 14 is a block diagram illustrating an exemplary system for generating extraction statements from a set of primary key character strings, according to embodiments of the present disclosure.

FIG. 14 is a block diagram illustrating an exemplary system 1400 for generating extraction statements from a set of primary key character strings, according to embodiments of the present disclosure. As shown in FIG. 14, system 1400 can include a character string extraction module 1411, a character string conversion module 1421, a segment length determination module 1431, a segment node determination module 1441, and a segment node character string determination module 1451. In some embodiments, system 1400 can perform at least some of the steps of method 1100 of FIG. 11.

Character string extraction module 1411 is configured to extract, from the primary key character strings, a first character string and a second character string. The first character string can be associated with a maximum ASCII code among the primary key strings, and the second character string can be associated with a minimum ASCII code value among the primary key character strings. In some embodiments, character string extraction module 1411 can perform at least a part of step 2001 of method 1100.

Character string conversion module 1421 is configured to, based on a preset base number, the positions of characters in the first and second character strings, and the ASCII code value associated with the characters, generate a first integer and a second integer using power addition and multiplication. In some embodiments, character string conversion module 1421 can perform at least a part of step 2002 of method 1100.

Segment length determination module 1431 is configured to calculate a numeric range based on the first and second integers, and then divide the numeric range by a preset number of segment lengths. In a case where the remainder is non-zero, the system may perform an integer division of the numeric range by a preset number of segments to obtain a quotient for a first segment length, and then obtain a second segment length by adding one to the first segment length. In some embodiments, character string conversion module 1431 can perform at least a part of step 2003 of method 1100.

Segment node determination module 1441 is configured to perform an accumulation operation based on one of the first and second integers, and the segment lengths, to obtain an integer that corresponds to a segment node obtained by dividing the numeric range. In some embodiments, segment length determination module 1441 can perform at least a part of step 2004 of method 1100.

Segment node character string determination module 1451 is configured to convert the numeric values of each segment node back to a set of ASCII codes, and a character string that correspond to the set of ASCII codes. Segment node character string determination module 1451 can then generate an extraction statement including the character string for each of the segment node, and then associate each extraction statement with a thread. The extraction statements can then be transmitted to a database when the associated thread is executed to extract portions of data, thereby enabling multithreading extraction of data.

In some embodiments, segment node character string determination module 1451 can perform at least a part of step 2005 of method 1100.

Figure 15:
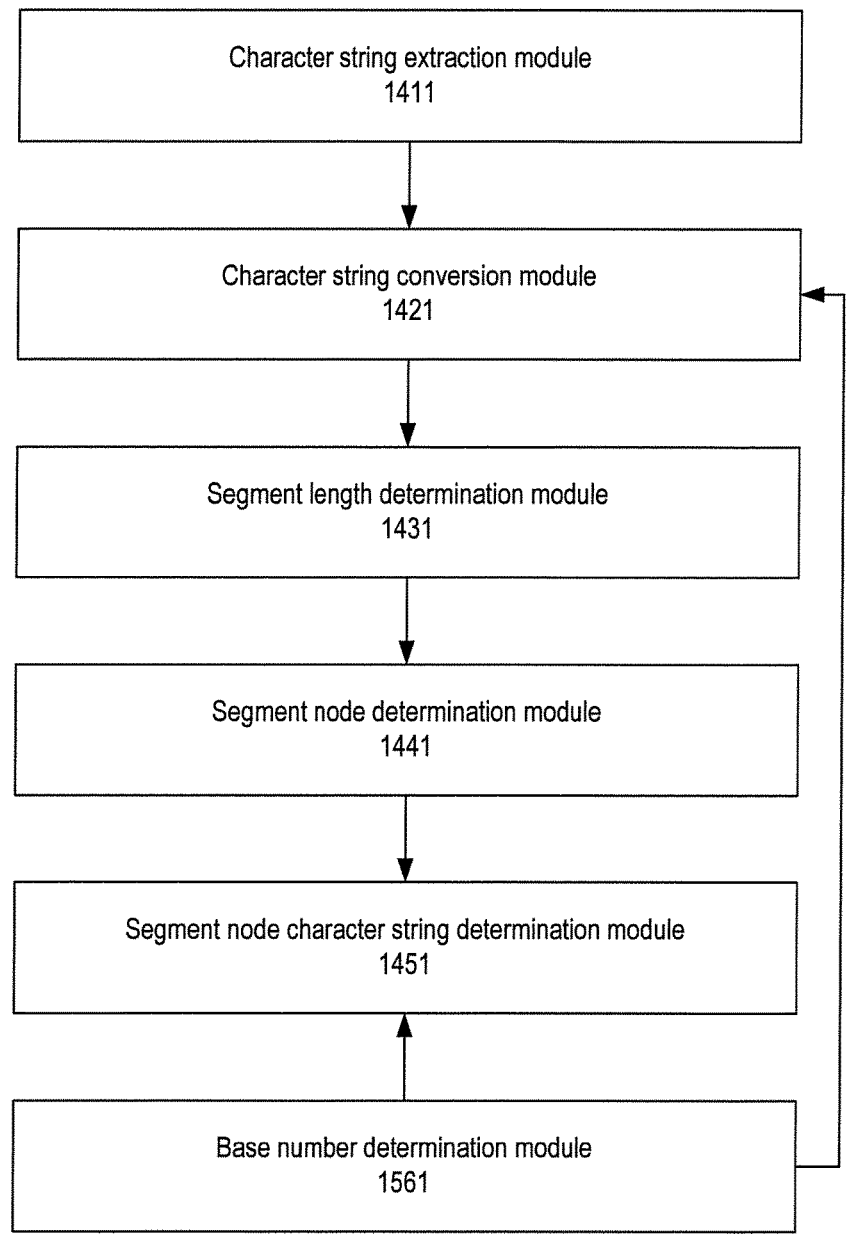
FIG. 15 is a block diagram illustrating an exemplary system for generating extraction statements from a set of primary key character strings, according to embodiments of the present disclosure.

FIG. 15 is a block diagram illustrating an exemplary system 1500 for generating extraction statements from a set of primary key character strings, according to embodiments of the present disclosure. As shown in FIG. 15, system 1500 can include character string extraction module 1411, character string conversion module 1421, segment length determination module 1431, segment node determination module 1441, segment node character string determination module 1451, and a base number determination module 1561, which can preset a base number for character string conversion module 1421 and segment node determination module 1441.

In some embodiments, base number determination module 1561 can set a base number based on the total number of characters that the ASCII codes can represent, or a base number based on combined maximum ASCII codes and combined minimum ASCII codes according to Formulae 7 and 8 above. In a case where the base number is set based on the total number of characters that the ASCII codes can represent, the conversion of ASCII codes back to character strings can be performed according to Formula 9. In a case where the base number is set based on combined maximum ASCII codes and combined minimum ASCII codes, the conversion of ASCII codes back to character strings can be performed according to Formula 10, as discussed above.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, the present invention may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems) and computer program products according to embodiments of the present invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory.

The memory may include forms of a volatile memory, a random access memory (RAM) and/or non-volatile memory and the like, such as a read-only memory (ROM) or a flash RAM in a computer readable medium. The memory is an example of the computer readable medium.

The computer readable medium includes non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transitory media which may be used to store information capable of being accessed by a computer device. According to the definition of the context, the computer readable medium does not include transitory media, such as modulated data signals and carrier waves.

It will be further noted that the terms "comprises", "comprising" or any other variations are intended to cover non-exclusive inclusions, so as to cause a process, method, commodity or device comprising a series of elements to not only comprise those elements, but also comprise other elements that are not listed specifically, or also comprise elements that are inherent in this process, method, commodity or device. Therefore, the element defined by a sentence "comprising a . . . " does not preclude the presence of other same elements in the process, method, commodity or device including said elements under the condition of no more limitations.

As will be understood by those skilled in the art, embodiments of the present invention may be embodied as a method, a system or a computer program product. Accordingly, the present invention may take the form of an entirely hardware embodiment, an entirely software embodiment or an embodiment combining software and hardware. Furthermore, the present invention may take the form of a computer program product embodied in one or more computer available storage media (including but not limited to a magnetic disk memory, a CD-ROM, an optical memory and so on) containing computer available program codes.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method of multithreading extraction of data from a database, the method comprising:
    acquiring a set of primary key character strings from the database by a processor, the primary key character strings being uniquely associated with the data to be extracted from the database;
    extracting, from the primary key character strings, a first character string and a second character string, the first character string being associated with a maximum value among the primary key strings, and the second character string being associated with a minimum value among the primary key character strings;
    generating a first integer and a second integer based on: a preset base number, positions of characters included in the first and second character strings;
    determining a node segment based on the first and second integers, the node segment being associated with a node segment integer;
    converting the node segment integer to a node segment character;
    generating an extraction statement for the node segment character converted from the node segment integer; and
    associating the extraction statement with a thread;
    wherein the extraction statement is transmitted to the database to extract portions of the data for processing by the processor when the associated thread is executed by the processor.

2. The method of claim 1, wherein generating the first and second integers comprises:

generating one or more first products by multiplying each value associated with each character of the first character string with the base number raised to a power according to a position of the each character in the first character string;

determining the first integer based on a summation of the first products;

generating one or more second products by multiplying each value associated with each character of the second character string with the base number raised to a power according to a position of the each character in the second character string; and determining the second integer based on a summation of the second products.

3. The method of claim 1, wherein the association between the values and the characters is based on American Standard Code for Information Interchange (ASCII), and wherein the base number is set based on a range of values defined under ASCII.

4. The method of claim 3, wherein converting the node segment integer to the node segment character comprises:
performing successive division on the node segment integer to generate a quotient and a remainder; and
converting the remainder to the node segment character.

5. The method of claim 1, wherein the base number is set based on a combined maximum value and a combined minimum value, the combined maximum value being associated with a character among the characters included in the first and second character strings, the combined minimum value being associated with a character among the characters included in the first and second character strings.

6. The method of claim 5, wherein converting the node segment integer to the node segment character comprises:
performing successive division on the node segment integer to generate a quotient and a remainder;
generating a second integer based on the remainder and the combined minimum value; and
converting the second integer to the node segment character.

7. The method of claim 1, wherein determining the node segment comprises:
determining whether a remainder of a division of a numeric range by a predetermined number of node segments is zero.

8. The method of claim 7, wherein determining the node segment comprises:
responsive to determining that a remainder of a division of a numeric range by a predetermined number of node segments is not zero:
determining a first segment length based on an integer division of the numeric range by the predetermined number of node segments;
determining a second segment length based on the first segment length; and
determining a first number of node segments associated with the first segment length and a second number of node segments associated with the second segment length, a sum of the first and second number of node segments being equal to the predetermined number of node segments.

9. The method of claim 7, wherein determining the node segment comprises:
determining whether the numeric range is smaller than the predetermined number of node segments; and
upon determining that the numeric range is smaller than the predetermined number of node segments, adjusting the predetermined number of node segments;
wherein the division of the numeric range is by the adjusted predetermined number of node segments.

10. A non-transitory computer readable medium storing instructions that are executable by one or more processors to cause the one or more processors to execute a method of multithreading extraction of data from a database, the method comprising:
acquiring a set of primary key character strings from the database, the primary key character strings being uniquely associated with the data to be extracted from the database;
extracting, from the primary key character strings, a first character string and a second character string, the first character string being associated with a maximum value among the primary key strings, and the second character string being associated with a minimum value among the primary key character strings;
generating a first integer and a second integer based on: a preset base number, positions of characters included in the first and second character strings;
determining a node segment based on the first and second integers, the node segment being associated with a node segment integer;
converting the node segment integer to a node segment character;
generating an extraction statement for the node segment character converted from the node segment integer; and
associating the extraction statement with a thread;
wherein the extraction statement is transmitted to the database to extract portions of the data for processing by a processor when the associated thread is executed by the processor.

11. The medium of claim 10, wherein generating the first and second integers comprises:
generating one or more first products by multiplying each value associated with each character of the first character string with the base number raised to a power according to a position of the each character in the first character string;
determining the first integer based on a summation of the first products;
generating one or more second products by multiplying each value associated with each character of the second character string with the base number raised to a power according to a position of the each character in the second character string; and
determining the second integer based on a summation of the second products.

12. The medium of claim 10, wherein the association between the values and the characters is based on American Standard Code for Information Interchange (ASCII), and wherein the base number is set based on a range of values defined under ASCII.

13. The medium of claim 12, wherein converting the node segment integer to the node segment character comprises:
performing successive division on the node segment integer to generate a quotient and a remainder; and
converting the remainder to the node segment character.

14. The medium of claim 10, wherein the base number is set based on a combined maximum value and a combined minimum value, the combined maximum value being associated with a character among the characters included in the first and second character strings, the combined minimum value being associated with a character among the characters included in the first and second character strings.

15. The medium of claim 14, wherein converting the node segment integer to the node segment character comprises:

performing successive division on the node segment integer to generate a quotient and a remainder;

generating a second integer based on the remainder and the combined minimum value; and converting the second integer to the node segment character.

16. The medium of claim 10, wherein determining the node segment comprises:

determining whether a remainder of a division of a numeric range by a predetermined number of node segments is zero.

17. The medium of claim 16, wherein determining the node segment comprises:

responsive to determining that a remainder of a division of a numeric range by a predetermined number of node segments is not zero:

determining a first segment length based on an integer division of the numeric range by the predetermined number of node segments;

determining a second segment length based on the first segment length; and determining a first number of node segments associated with the first segment length and a second number of node segments associated with the second segment length, a sum of the first and second number of node segments being equal to the predetermined number of node segments.

18. The medium of claim 16, wherein determining the node segment comprises:

determining whether the numeric range is smaller than the predetermined number of node segments; and upon determining that the numeric range is smaller than the predetermined number of node segments, adjusting the predetermined number of node segments;

wherein the division of the numeric range is by the adjusted predetermined number of node segments.

19. A system for multithreading extraction of data from a database, the system comprising:

a memory device that stores a set of instructions; and a hardware processor configured to execute the set of instructions to:

acquire a set of primary key character strings from the database, the primary key character strings being uniquely associated with the data to be extracted from the database;

extract, from the primary key character strings, a first character string and a second character string, the first character string being associated with a maximum value among the primary key strings, and the second character string being associated with a minimum value among the primary key character strings;

generate a first integer and a second integer based on: a preset base number, positions of characters included in the first and second character strings;

determine a node segment based on the first and second integers, the node segment being associated with a node segment integer;

convert the node segment integer to a node segment character;

generate an extraction statement for the node segment character converted from the node segment integer; and associate the extraction statement with a thread;

wherein the extraction statement is transmitted to the database to extract portions of the data for processing by a processor when the associated thread is executed by the processor.

20. The system of claim 19, wherein the base number is set based on a combined maximum value and a combined minimum value, the combined maximum value being associated with a character among the characters included in the first and second character strings, the combined minimum value being associated with a character among the characters included in the first and second character strings.

* * * * *